United States Patent
Yanazawa et al.

(10) Patent No.: US 9,711,258 B2
(45) Date of Patent: Jul. 18, 2017

(54) WIRE HARNESS AND METHOD FOR MANUFACTURING WIRE HARNESS

(71) Applicant: YAZAKI CORPORATION, Tokyo (JP)

(72) Inventors: Kenta Yanazawa, Shizuoka (JP); Hideomi Adachi, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/232,667

(22) Filed: Aug. 9, 2016

(65) Prior Publication Data
US 2017/0076837 A1   Mar. 16, 2017

(30) Foreign Application Priority Data
Sep. 14, 2015   (JP) ................. 2015-180285

(51) Int. Cl.
| | |
|---|---|
| *H01B 7/00* | (2006.01) |
| *H01B 13/012* | (2006.01) |
| *H01B 7/17* | (2006.01) |
| *H01B 13/22* | (2006.01) |
| *B60R 16/02* | (2006.01) |
| *H02G 3/04* | (2006.01) |

(52) U.S. Cl.
CPC ....... *H01B 7/0045* (2013.01); *B60R 16/0215* (2013.01); *H01B 7/17* (2013.01); *H01B 13/012* (2013.01); *H01B 13/22* (2013.01); *H02G 3/0481* (2013.01)

(58) Field of Classification Search
CPC ...... H01B 7/0045; H01B 7/17; H01B 13/012; H01B 13/22
USPC ...................................... 174/72 A
See application file for complete search history.

(56) References Cited

U.S. PATENT DOCUMENTS

| | | | |
|---|---|---|---|
| 6,505,386 B1 * | 1/2003 | Allie | F16B 5/0685 |
| | | | 24/289 |
| 2011/0297415 A1 | 12/2011 | Katou et al. | |
| 2015/0219332 A1 * | 8/2015 | Nakamori | F22B 37/18 |
| | | | 165/69 |

FOREIGN PATENT DOCUMENTS

| | | |
|---|---|---|
| JP | 2011-254614 A | 12/2011 |
| JP | 2017055539 | * 3/2017 |

\* cited by examiner

*Primary Examiner* — Timothy Thompson
*Assistant Examiner* — Charles Pizzuto
(74) *Attorney, Agent, or Firm* — Kenealy Vaidya LLP

(57) ABSTRACT

A wire harness includes: a tubular outer member; a conductive path which is inserted in and protected by the outer member; and a vibration suppressing member which reduces a movable range of the conductive path to suppress shakes of the conductive path. The vibration suppressing member includes an inward projection portion which projects inward from a tube inner surface of the outer member in a state in which the vibration suppressing member is attached to the outer member from a side of a tube outer surface after insertion of the conductive path.

11 Claims, 9 Drawing Sheets

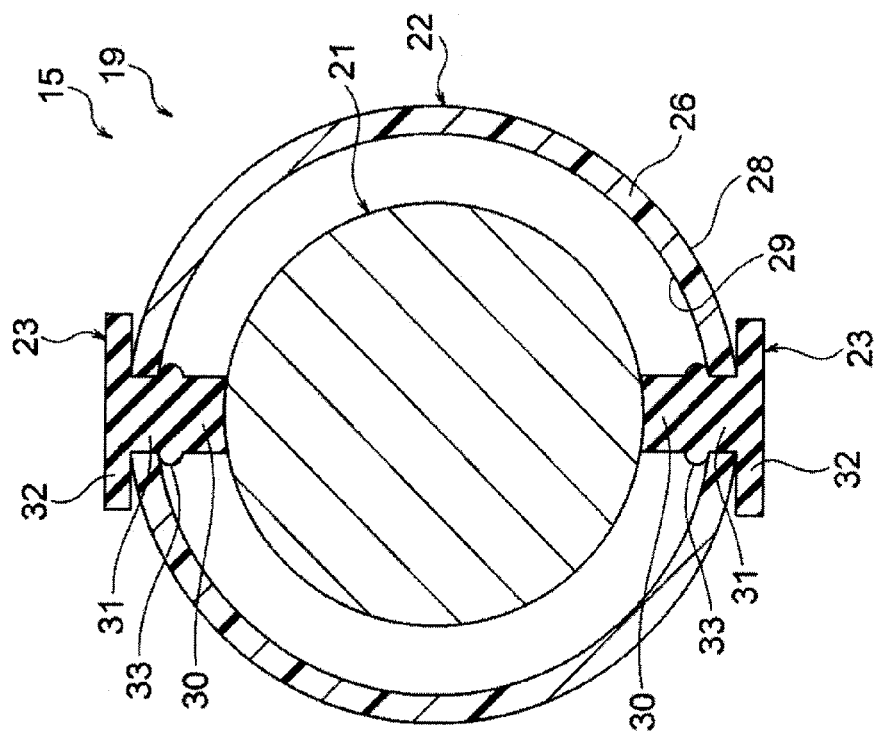
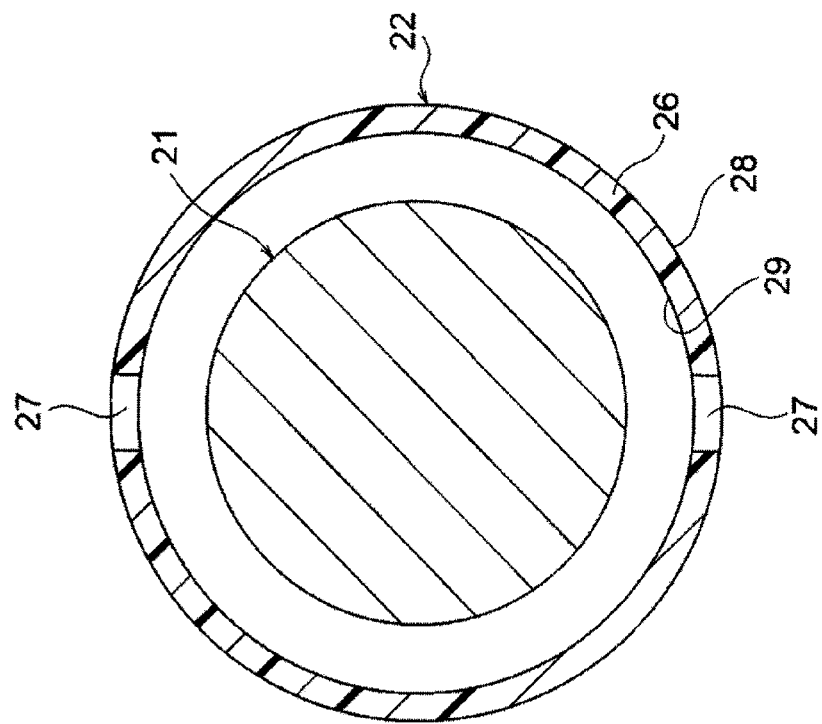

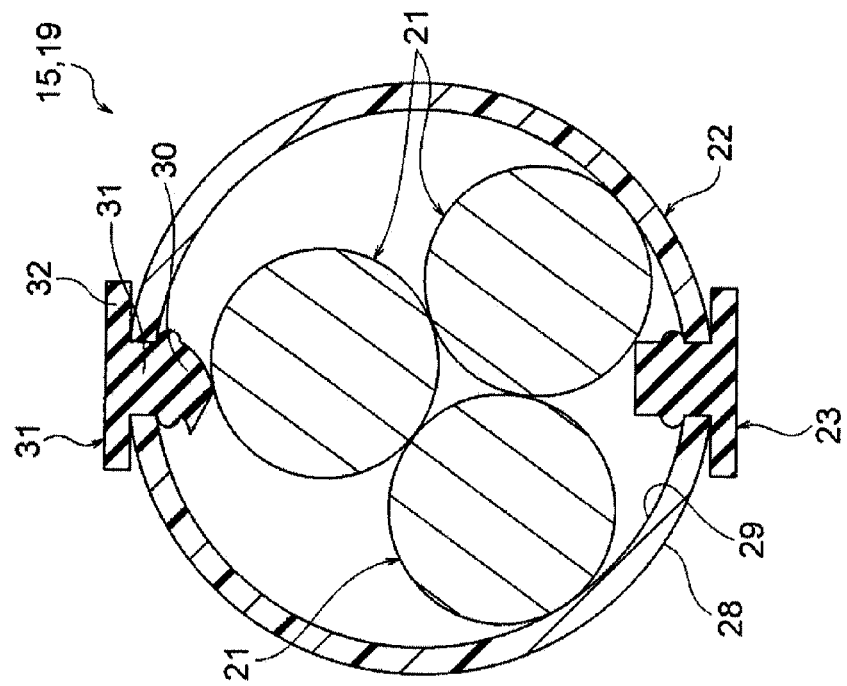
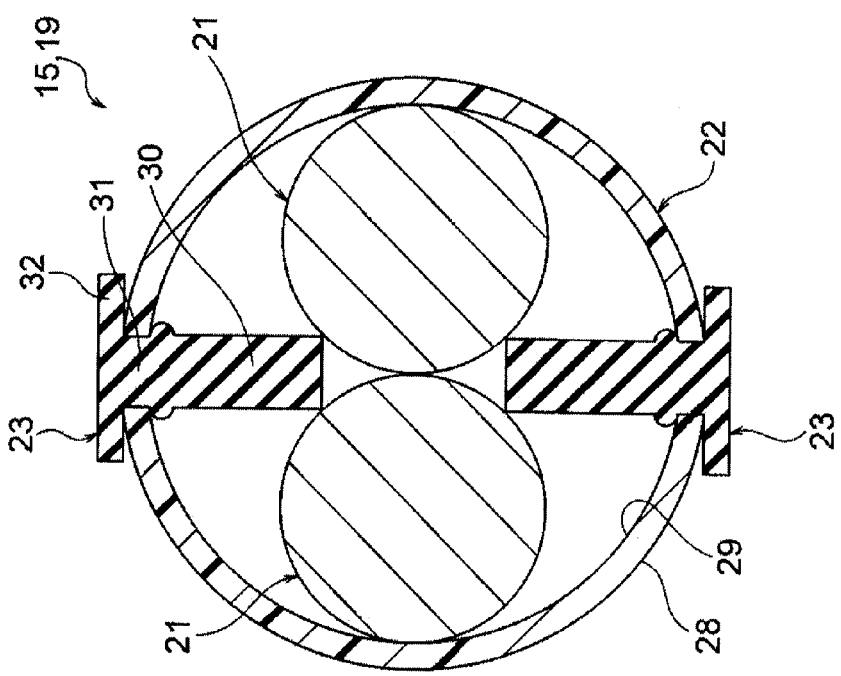

WIRE HARNESS AND METHOD FOR MANUFACTURING WIRE HARNESS

CROSS REFERENCE TO RELATED APPLICATION(S)

This application is based on and claims priority from Japanese Patent Application (Application No. 2015-180285) filed on Sep. 14, 2015, the entire contents of which are incorporated herein by reference.

BACKGROUND

1. Field of the Invention

One or more embodiments of the present invention relate to a wire harness having a tubular outer member and one or plural conductive paths that are inserted in and protected by the outer member, as well as to a method for manufacturing such a wire harness.

2. Description of the Related Art

Wire harnesses are used for electrically connecting apparatus installed in an automobile. Wire harnesses are equipped with a tubular outer member and one or plural conductive paths housed in the outer member. For example, JP-A-2011-254614 discloses a wire harness which is long and is routed so that part of it runs under the floor of an automobile. The portion, running under the floor of an automobile, of the wire harness goes straightly. In the wire harness disclosed in JP-A-2011-254614, a phenomenon occurs that in its straightly routed portion the conductive path(s) housed in the outer member shakes due to vibration of the automobile while it is running.

SUMMARY

In the above conventional wire harness, when the conductive path(s) housed in the outer member shakes due to vibration of the automobile while it is running, a covering (a braid or a metal foil provided outside the conductive path(s) in the case where it has a shield function) of the conductive path(s) may hit the outer member and thereby be damaged. Example countermeasures are to provide members for suppressing vibration of the conductive path(s) inside the outer member and to decrease the diameter of the outer member. However, these countermeasures have a drawback that they lower the efficiency of work of inserting the conductive path(s) into the outer member.

The present invention has been made in view of the above circumstances, and an object of the invention is therefore to provide a wire harness capable of suppressing shakes of a conductive path(s) inside an outer member while securing high efficiency of work of inserting the conductive path(s) into the outer member, as well as a method for manufacturing such a wire harness.

A first aspect of the invention provides a wire harness including: a tubular outer member; a conductive path which is inserted in and protected by the outer member; and a vibration suppressing member which reduces a movable range of the conductive path to suppress shakes of the conductive path, wherein the vibration suppressing member includes an inward projection portion which projects inward from a tube inner surface of the outer member in a state in which the vibration suppressing member is attached to the outer member from a side tube outer surface side after insertion of the conductive path.

In the first aspect of the invention, the vibration suppressing member is attached to the outer member from the side of its tube outer surface after insertion of the conductive path. The efficiency of work of inserting the conductive path is high because the vibration suppressing member has not been attached to the outer member yet. The inward projection portion of the vibration suppressing member attached reduces the movable range of the conductive path, whereby shakes of the conductive path(s) are suppressed. Vibration of the conductive path relative to the outer member is thus suppressed by the vibration suppressing member.

A second aspect of the invention provides a wire harness which is based on the wire harness according to the first aspect, wherein a position where the vibration suppressing member is attached to the outer member includes a position of at least a portion of the outer member to be routed straightly.

In the second aspect of the invention, the vibration suppressing member or members are attached to a portion, to be routed straightly, of the outer member (the conductive path is prone to shake in this portion). Therefore, even in the portion where the conductive path is prone to shake, vibration of the conductive path relative to the outer member is suppressed.

A third aspect of the invention provides a wire harness which is based on the wire harness according to the second aspect, wherein the portion of the outer member to be routed straightly has a circular shape in cross section.

In the third aspect of the invention, the vibration suppressing member or members are attached to a portion, having a circular cross section, of the outer member (the conductive path is prone to shake in this portion). Therefore, even in the portion where the conductive path is prone to shake, vibration of the conductive path relative to the outer member is suppressed.

A fourth aspect of the invention provides a wire harness which is based on the wire harness according to the second or third aspect, wherein the portion of the outer member to be routed straightly is to be routed under a floor of an automobile.

In the fourth aspect of the invention, the vibration suppressing member or members are attached to a long portion, to be routed straightly, of the outer member (e.g., a portion to be routed under the floor of an automobile). Therefore, even in the portion where the conductive path is prone to shake, vibration of the conductive path relative to the outer member is suppressed.

A fifth aspect of the invention provides a wire harness which is based on the wire harness according to any one of the first to fourth aspects, wherein the wire harness includes a plurality of vibration suppressing members which are attached to the outer member so as to be arranged in a tube axial direction of the outer member straightly at a predetermined interval, in a staggered manner, or at a constant pitch around a tube axis of the outer member.

In the fifth aspect of the invention, the plural vibration suppressing members are attached to the outer member so as to be arranged in the tube axial direction straightly at a predetermined interval, in a staggered manner, or at a constant pitch around the tube axis of the outer member. Since the plural vibration suppressing members are attached at regular positions and their inward projection portions suppress shakes of the conductive path, vibration of the conductive path relative to the outer member is suppressed properly.

A sixth aspect of the invention provides a wire harness which is based on the wire harness according to the fifth aspect, wherein the predetermined interval is equal to about 200 mm.

In the sixth aspect of the invention, since the plural vibration suppressing members are attached at the interval that is equal to about 200 mm and their inward projection portions suppress shakes of the conductive path, vibration of the conductive path relative to the outer member is suppressed properly. The interval of about 200 mm is one of intervals that are effective in suppressing vibration of wire harnesses routed in automobiles.

A seventh aspect of the invention provides a wire harness which is based on the wire harness according to any one of the first to sixth aspects, wherein the vibration suppressing member is made of an elastically deformable material.

In the seventh aspect of the invention, the inward projection portion of the vibration suppressing member is deformed elastically receiving force from the conductive path. That is, since vibration is absorbed by the elastic deformation, vibration of the conductive path relative to the outer member is suppressed. This aspect of the invention can accommodate both of the case of a single conductive path and the case of plural conductive paths because the inward projection portion is deformed elastically.

An eighth aspect of the invention provides a wire harness which is based on the wire harness according to any one of the first to seventh aspects, wherein the vibration suppressing member further includes: an outer member penetration portion which penetrates through a through-hole formed in the outer member; and an outward projection portion which projects from the tube outer surface of the outer member and covers the through-hole.

In the eighth aspect of the invention, the vibration suppressing member having the inward projection portion, the outer member penetration portion, and the outward projection portion is attached to the outer member from the side of its tube outer surface after insertion of the conductive path. The through-hole is formed through the outer member, and the vibration suppressing member is attached by inserting the inward projection portions into the through-hole. Since the through-hole is covered with the outward projection portion, entrance of water, dust, or other foreign matter to the inside of the outer member is prevented. Furthermore, this aspect of the invention makes it possible to check whether or not there remains an unattached through-hole by visually inspecting outward projection portion.

A ninth aspect of the invention provides a wire harness which is based on the wire harness according to the eighth aspect, wherein the through-hole is formed so as to serve as a water drainage hole.

According to the ninth aspect of the invention, even if water has collected inside the outer member, it can be drained away through the through-hole.

A tenth aspect of the invention provides a wire harness which is based on the wire harness according to the eighth or ninth aspect, further including: a link portion which is integrated with the outward projection portions of vibration suppressing members to connect the vibration suppressing members to each other.

According to the tenth aspect of the invention, since plural vibration suppressing members are integrated together by a link portion, a worker can attach the vibration suppressing members more easily than in a case of attaching them by holding them individually. Furthermore, the management of components is made simpler.

An eleventh aspect of the invention provides a method for manufacturing a wire harness, comprising: inserting a conductive path into a tubular outer member; and attaching a vibration suppressing member including an inward projection portion to the outer member from a side of a tube outer surface after insertion of the conductive path to cause the inward projection portion to project inward from a tube inner surface of the outer member.

According to the eleventh aspect of the invention, since the vibration suppressing member is attached to the outer member from the side of its tube outer surface after insertion of the conductive path, the inward projection portion of the vibration suppressing member reduces the movable range of the conductive path at the predetermined position of the outer member, whereby shakes of the vibration suppressing member are suppressed. Thus, vibration of the conductive path relative to the outer member can be suppressed by the outward projection portion.

The first aspect of the invention provides an advantage that shakes of the conductive path inside the outer member can be suppressed while high efficiency of work of inserting the conductive path into the outer member is attained.

The second aspect of the invention provides an advantage that shakes of the conductive path in the outer member can be suppressed even in a portion, to be wired straightly, of the wire harness, that is, a portion where the conductive path is prone to shake.

The third aspect of the invention provides an advantage that shakes of the conductive path in the outer member can be suppressed even in a portion, having a circular cross section, of the wire harness, that is, a portion where the conductive path is prone to shake.

The fourth aspect of the invention provides an advantage that shakes of the conductive path in the outer member can be suppressed even in a long portion, to be wired straightly, of the wire harness (e.g., a portion to be routed under the floor of an automobile), that is, a portion where the conductive path is prone to shake.

The fifth aspect of the invention provides an advantage that shakes of the conductive path in the outer member can be suppressed properly because the plural vibration suppressing members are attached so as to be arranged regularly.

The sixth aspect of the invention provides an advantage that shakes of the conductive path in the outer member can be suppressed properly because the plural vibration suppressing members are attached at the interval that is equal to about 200 mm.

The seventh aspect of the invention provides an advantage that shakes of the conductive path in the outer member can be suppressed because vibration is absorbed by elastic deformation of the inward projection portion.

Since the vibration suppressing member has the inward projection portion, the outer member penetration portion, and the outward projection portion, the eighth aspect of the invention provides advantages that the movable range of the conductor path is reduced by the inward projection portion and shakes of the conductor path are thereby suppressed, that the outer member penetration portion can penetrate through the through-hole of the outer member, and that the through-hole can be covered with the outward projection portion. That is, this aspect of the invention provides an advantage that a vibration suppressing member having a better structure can be provided.

The ninth aspect of the invention provides an advantage that water that has collected inside the outer member can be drained away through the through-hole of the outer member. Furthermore, this aspect of the invention provides an advantage that through-holes that are located at positions other than the position where the vibration suppressing member is attached can be utilized effectively.

The tenth aspect of the invention provides an advantage of contributing to increase of the work efficiency and improvement of the management of components because plural vibration suppressing members are integrated together by a link portion.

The eleventh aspect of the invention provides an advantage that the employment of this method for manufacturing a wire harness can suppress shakes of the conductive path inside the outer member while securing high efficiency of work of inserting the conductive path into the outer member.

BRIEF DESCRIPTION OF THE DRAWINGS

FIGS. 3A and 3B show an outer member and a conductive path shown in FIG. 2 as well as a first step of a method for manufacturing a wire harness in which FIG. 3A is a perspective view of the outer member and FIG. 3B is a perspective view of the outer member in which the conductive path is inserted;

FIGS. 5A and 5B show the first step and a second step of the method for manufacturing a wire harness in which FIG. 5A is a sectional view taken along line B-B in FIG. 3B (first step) and FIG. 5B is a sectional view taken along line C-C in FIG. 2;

FIGS. 9A and 9B are sectional views showing wire harnesses according to other modifications, that is, a wire harness having two conductive paths and a wire harness having three conductive paths, respectively.

DETAILED DESCRIPTION

The present invention provides a wire harness which is equipped with a tubular outer member and one or plural conductive paths which are inserted in and protected by the outer member. The wire harness is also equipped with one or plural vibration suppressing members. The vibration suppressing member(s) has an inward projection portion which projects inward from a tube inner surface of the outer member when the vibration suppressing member(s) is attached to the outer member from the side of its tube outer surface after insertion of the conductive path(s). Since the vibration suppressing member(s) is attached to the outer member after insertion of the conductive path(s), the efficiency of work of inserting the conductive path(s) is high. The inward projection portion(s) of the vibration suppressing member(s) attached reduces the movable range of the conductive path(s) at a predetermined position(s) inside the outer member, shakes of the conductive path(s) are suppressed. Vibration of the conductive path(s) relative to the outer member is thus suppressed by the vibration suppressing member(s).

Figure 1A:
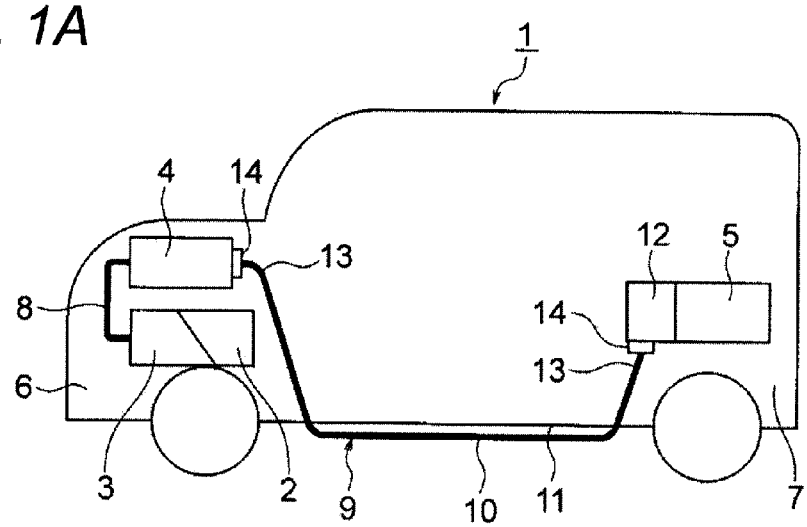
FIGS. 1A and 1B show a wire harness according to an embodiment of the present invention, that is, how a high-voltage wire harness and a low-voltage wire harness are routed, respectively.
Figure 1B:
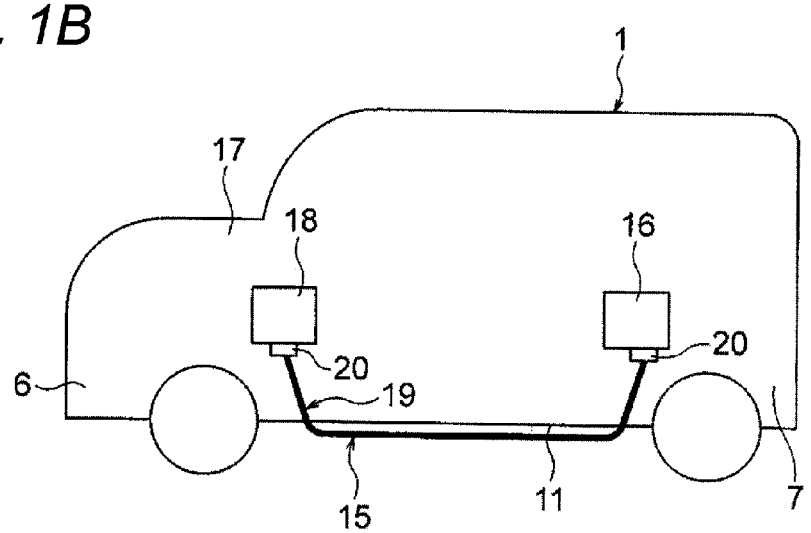
Figure 2:
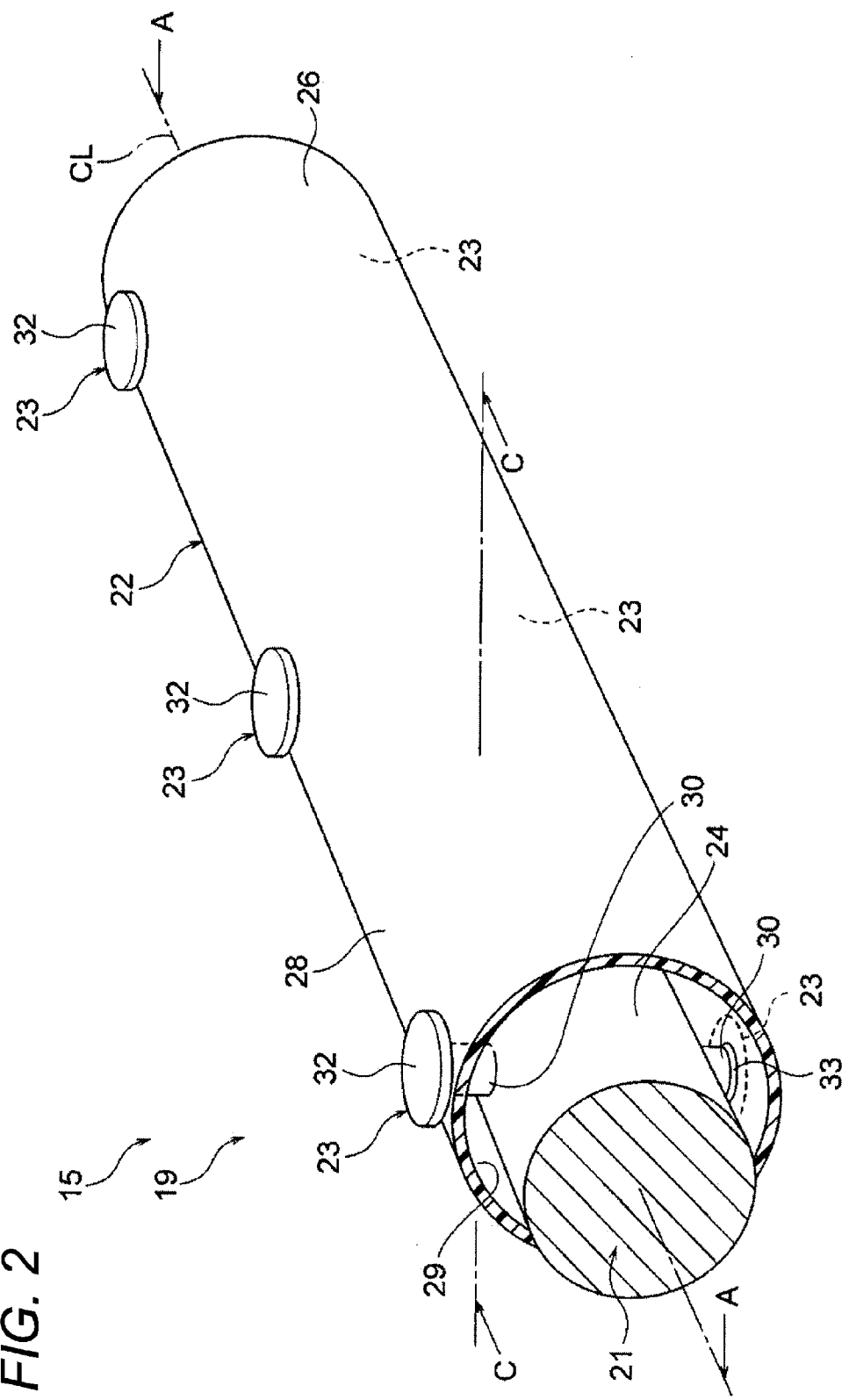
FIG. 2 is a perspective view showing the configuration of the wire harness according to the embodiment.
Figure 3:
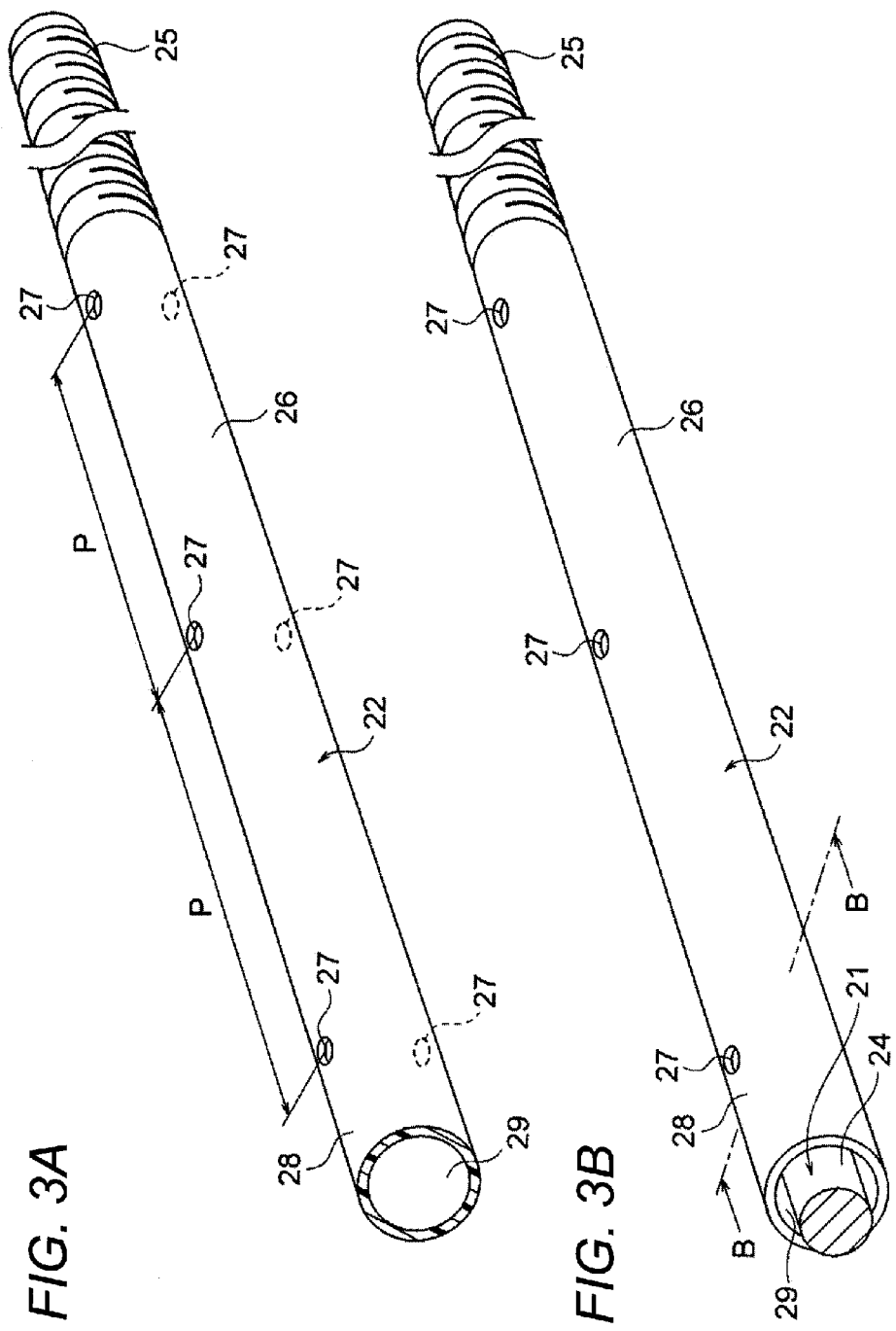
Figure 4:
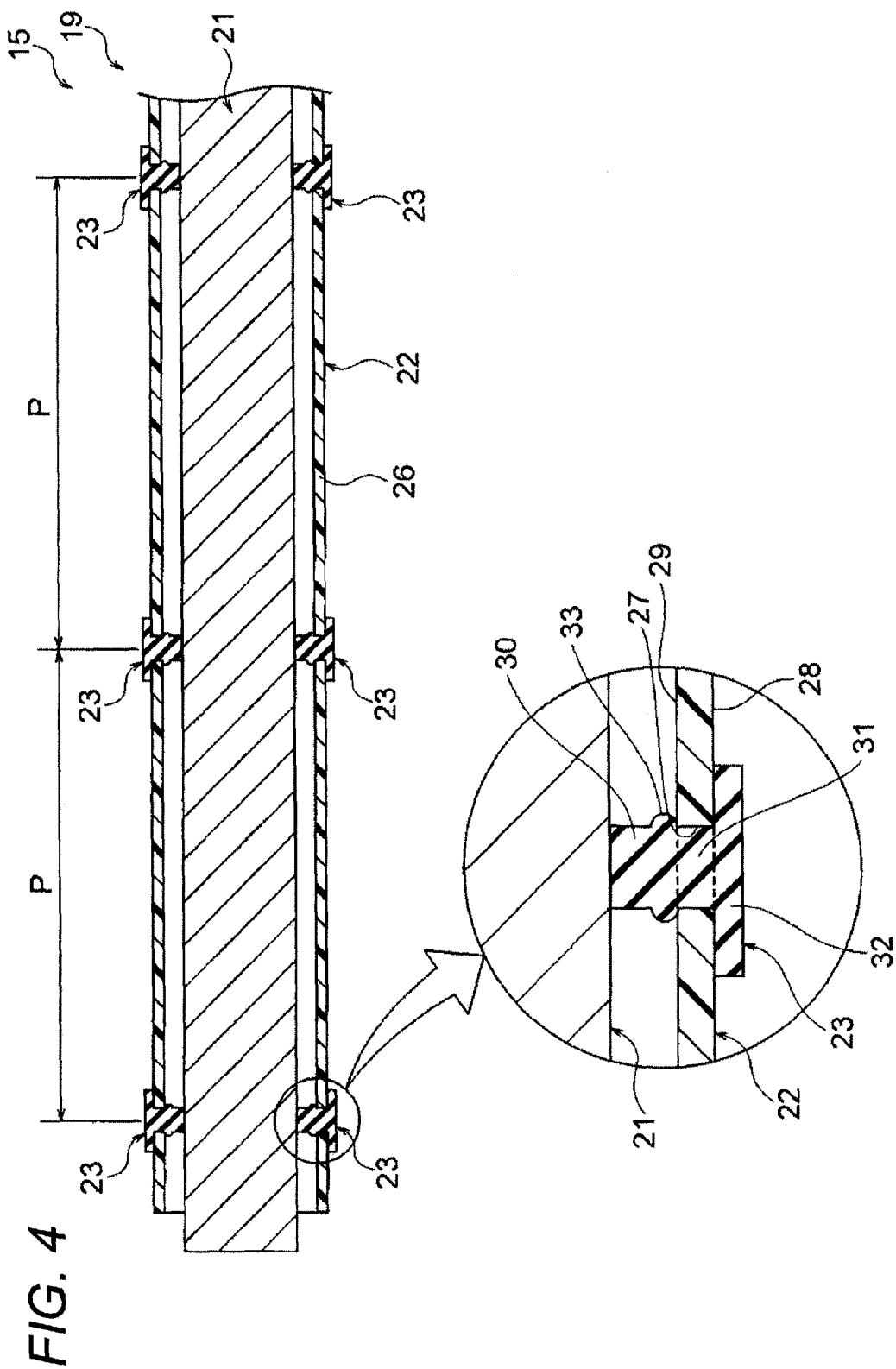
FIG. 4 is a sectional view taken along line A-A in FIG. 2.

An embodiment of the invention will be hereinafter described with reference to the drawings. FIGS. 1A and 1B show a wire harness according to the embodiment. FIG. 2 is a perspective view showing the configuration of the wire harness according to the embodiment. FIGS. 3A and 3B show an outer member and a conductive path shown in FIG. 2 as well as a first step of a method for manufacturing a wire harness. FIG. 4 is a sectional view taken along line A-A in FIG. 2. FIGS. 5A and 5B shows the first step and a second step of the method for manufacturing a wire harness.

The embodiment is such that the invention is applied to a wire harness that is routed in a hybrid vehicle. (The invention may also be applied to an electric vehicle, an ordinary automobile that runs using an engine, or the like).

<Configuration of Hybrid Vehicle 1>

As shown in FIG. 1A, a hybrid vehicle 1 is driven by mixing two kinds of motive power of an engine 2 and a motor unit 3. Electric power is supplied from a battery (battery pack) 5 to the motor unit 3 via an inverter unit 4. In the embodiment, the engine 2, the motor unit 3, and the inverter unit 4 are mounted in an engine room 6 which is located adjacent to the front wheels etc. The battery 5 is mounted in a vehicle rear part 7 where the rear wheels etc. are disposed (or may be mounted in the vehicle compartment which is located in the rear of the engine room 6).

The motor unit 3 and the inverter unit 4 are connected to each other by a high-voltage wire harness (high-voltage motor cable) 8. Likewise, the battery 5 and the inverter unit 4 are connected to each other by a high-voltage wire harness 9. An intermediate portion 10 of the wire harness 9 is routed under a vehicle floor 11 of the vehicle (vehicle body). The intermediate portion 10 is routed along the vehicle floor 11 approximately parallel with it. The vehicle floor 11, which is a known vehicle body part and is what is called a panel member, is formed with through-holes at predetermined positions. The wire harness 9 is inserted through the through-holes water-tightly.

The wire harness 9 and the battery 5 are connected to each other via a junction block 12 which is attached to the battery 5. An external connection means such as a shield connector 14 provided for a rear-end harness terminal 13 of the wire harness 9 is electrically connected to the junction block 12. The wire harness 9 is electrically connected to the inverter unit 4 via an external connection means such as another shield connector 14 provided for a front-end harness terminal 13 of the wire harness 9.

The motor unit 3 includes a motor and a generator, and the inverter unit 4 includes an inverter and a converter. The motor unit 3 is implemented as a motor assembly including a shield case. Likewise, the inverter unit 4 is implemented as an inverter assembly including a shield case. The battery 5 is of an Ni-MH type or an Li-ion type and is implemented as a module. Alternatively, a storage device such as a capacitor can be used as the battery 5. It goes without saying that there are no particular limitations on the battery 5 as long as it can be used for the hybrid vehicle 1 or an electric vehicle.

As shown in FIG. 1B, a wire harness 15, which is a low-voltage wire harness, is provided to electrically connect a low-voltage battery 16 disposed in the vehicle rear part 7 of the hybrid vehicle 1 to an auxiliary device (device) 18 mounted in a vehicle font part 17. Like the wire harness 9 shown in FIG. 1A, part of the wire harness 15 is routed under the vehicle floor 11 (this is just an example; it may be routed on the compartment side).

As shown in FIGS. 1A and 1B, the high-voltage wire harnesses 8 and 9 and the low-voltage wire harness 15 are routed in the hybrid vehicle 1. Although the invention is applicable to any of them, the following description will be made of a representative one, that is, the low-voltage wire harness 15.

<Configuration of Wire Harness 15>

As shown in FIG. 1B, the long wire harness 15, part of which is routed straightly under the vehicle floor 11, is equipped with a harness body 19 and connectors 20 provided for the two respective terminals of the harness body 19. The wire harness 15 is also equipped with fixing members (e.g., clamps) for wiring itself along a predetermined route and water stop members (e.g., grommets).

<Configuration of Harness Body 19>

As shown in FIG. 2, the harness body 19 is equipped with one conductive path 21, an outer member 22 which houses and protects the conductive path 21, and plural vibration suppressing members 23. Although this wire harness 15 has only one conductive path 21, this is just an example and wire harnesses having two and three conductive paths 21 will be described later with reference to FIGS. 9A and 9B, respectively. A wire harness having plural conductive paths 21 may include a high-voltage conductive path. The structure of the conductive path 21 of the harness body 19 will be described first and the structures of the outer member 22 and the vibration suppressing members 23 will be described thereafter.

<Structure of Conductive Path 21>

As shown in FIG. 2, the conductive path 21 has a conductor and an insulator (covering) which is located outside the conductor. The conductor is made of copper, a copper alloy, aluminum, or an aluminum alloy and is circular in cross section. The conductor may be formed by twisting element wires together or have a rod structure which is rectangular or circular in cross section (e.g., a rectangular core or circular core conductor; in this case, the harness body 19 also has a rod structure). An insulator made of an insulative resin material is formed on the outer circumferential surface of the conductor by extrusion molding.

The insulator is formed on the outer circumferential surface of the conductor as a covering that is circular in cross section at a predetermined thickness by extrusion molding using a thermoplastic resin material. The thermoplastic resin material is selected as appropriate from various known polymeric materials such as a polyvinyl chloride resin, a polyethylene resin, and a polypropylene resin. Reference numeral 24 denotes the outer circumferential surface of the conductive path 21 (in this case, the outer circumferential surface of the insulator).

<Structure of Outer Member 22>

As shown in FIG. 2 and FIGS. 3A and 3B, the outer member 22 is formed by resin molding and has a single, straight (before use) tubular shape. Alternatively, the outer member 22 may be made of a metal. The outer member 22 is incapable of longitudinal division; in other words, it has no slit(s). The outer member 22 is circular in cross section. Unlike in the embodiment, the outer member 22 may have a sectional shape other than a true circle, such as an ellipse or a rectangle. There are no particular limitations on the sectional shape of the outer member 22 as long as it allows the conductive path 21 housed therein to move in a wide range.

The above-described outer member 22 has plural flexible tube portions 25 (see FIGS. 3A and 3B) and plural straight tube portions 26 for straight routing of the conductive path 21. The flexible tube portions 25 and the straight tube portions 26 are arranged alternately.

<Flexible Tube Portions 25>

Referring to FIGS. 3A and 3B, the flexible tube portions 25 are formed and arranged so as to be suitable for the shape of a vehicle portion in and to which the wire harness 15 is to be routed and attached. The lengths of the flexible tube portions 25 are not fixed but varied so as to be suitable for the shape of a target vehicle portion. The flexible tube portions 25 are formed so as to be bent at respective desired angles when the wire harness 15 (see FIG. 1B) is in a packed state, is transported, or is routed in a vehicle. That is, the flexible tube portions 25 are formed so as to be able to be bent and returned to the original straight form as resin-molded (see FIGS. 3A and 3B).

In the embodiment, each flexible tube portion 25 assume a bellows shape (however, there are no limitations on the shape of each flexible tube portion 25 as long as it is flexible). More specifically, each flexible tube portion 25 has bellows recesses and bellows projections that extend in the circumferential direction and arranged alternately and continuously in the tube axial direction.

<Straight Tube Portions 26>

As shown in FIG. 2 to FIGS. 5A and 5B, the straight tube portions 26 are formed having no such flexibility as the flexible tube portions 25 (see FIGS. 3A and 3B) have. That is, the straight tube portions 26 are formed as portions that are not bent when the wire harness 15 is in a packed state, is transported, or is routed in a vehicle (the term "not bent" means that they are not given flexibility in a positive sense). The straight tube portion 26 shown in FIGS. 3A and 3B is a long straight tube.

The straight tube portions 26 are formed as portions that should be more rigid than the flexible tube portion 25 shown in FIGS. 3A and 3B. The straight tube portions 26 are formed at positions and in lengths that are suitable for the shape of a target vehicle portion. In the embodiment, the straight tube portions 26 are formed as portions at least part of which are to be disposed under the vehicle floor 11 (see FIG. 1B). Plural vibration suppressing members 23, which are an important feature of the embodiment of the invention, are attached later to each straight tube portion 26. To this end, each straight tube portion 26 is formed with plural through-holes 27.

<Through-Holes 27>

As shown in FIGS. 3A and 3B, the through-holes 27, which are portions for attachment of the vibration suppressing members 23, are circular holes that penetrate through each straight tube portion 26 including its tube outer surface 28 and tube inner surface 29. The aperture diameter of the through-holes 27 is set as appropriate. For example, the through-holes 27 are formed in a direction in which the wire harness 15 vibrates during running of the vehicle (i.e., in the top-bottom direction in the paper surface).

The through-holes 27 are arranged straightly parallel with the direction of the tube axis CL of the outer member 22. More specifically, the through-holes 27 arranged straightly at a predetermined interval P which is equal to about 200 mm in this example. The interval that is equal to about 200 mm is the same as the attachment interval of the abovementioned fixing members (e.g., clamps; not shown). The through-holes 27 extend in the top-bottom direction and are arranged at the predetermined angle P, and the vibration suppressing members 23 are attached to each straight tube portion 26 at the same positions as the through-holes 27 are formed.

Alternatively, the through-holes 27 may be arranged in the tube axial direction at a 90° pitch around the tube axis CL of the outer member 22.

<Structure of Vibration Suppressing Members 23>

The vibration suppressing members 23, which are members for suppressing (absorbing) shakes of the conductive path 21 in the outer member 22, are made of an elastically deformable material (e.g., a rubber material) and formed in a shape shown in FIGS. 2, 4, 5A and 5B. As seen from these drawings, the vibration suppressing members 23 are formed at the predetermined positions (i.e., the positions where the through-holes 27 are formed) of the outer member 22 in such a shape as to reduce the movable ranges of the conductive path 21. Each vibration suppressing member 23 is composed of an inward projection portion 30, an outer member penetration portion 31, and an outward projection portion 32. The vibration suppressing members 23 are attached to the outer member 22 from outside its tube outer surface 28 after insertion of the conductive path 21.

Plural kinds of vibration suppressing members 23 are prepared so as to be used suitably for respective cases that are different from each other in the number of conductive paths 21. In the case shown in FIGS. 2, 4, 5A and 5B, vibration suppressing members 23 corresponding to the case of a single conductive path 21 are used.

<Inward Projection Portion 30>

As shown in FIGS. 2, 4, 5A and 5B, the inward projection portion 30 of each vibration suppressing member 23 is formed in such a shape as to project inward through the tube inner surface 29 when the vibration suppressing member 23 is attached to the outer member 22 from outside its tube outer surface 28 after insertion of the conductive path 21. Although in the embodiment the inward projection portion 30 has a cylindrical shape, the shape of the inward projection portion 30 is not limited to it.

In the embodiment, the inward projection portion 30 is formed in such a length that its tip portion is deformed elastically being pressed against the outer circumferential surface 24, that is, the conductive path 21 is sandwiched in the top-bottom direction between the inward projection portion 30 and another inward projection portion 30 opposed to the former. Alternatively, the inward projection portion 30 may be formed in such a length that its tip portion weakly touches the outer circumferential surface 24 of the conductive path 21 or that its tip portion is located close to the outer circumferential surface 24 (in the case where the vibration suppressing member 23 is attached to a top portion of the outer member 22).

A base portion of the inward projection portion 30 is formed with a ring-shaped lock projection 33, which serves as a portion for preventing the vibration suppressing member 23 from coming off the outer member 22 (this shape of the lock projection 33 is just an example). Alternatively, instead of forming the lock projection 33, the base portion of the inward projection portion 30 may be such as to prevent coming-off of the vibration suppressing member 23 by press fitting.

<Outer Member Penetration Portion 31>

As shown in FIGS. 2, 4, 5A and 5B, the outer member penetration portion 31 is formed as a portion to penetrate through a through-hole 27 of the outer member 22. Since the through-holes 27 are circular, the outer member penetration portion 31 is formed in a similar circular shape. In the embodiment, the outer member penetration portion 31 is formed in such a size as to be able to close a through-hole 27 completely (this is just an example; another example will be described later with reference to FIG. 8).

<Outward Projection Portion 32>

As shown in FIGS. 2, 4, 5A and 5B, the outward projection portion 32 is formed as a portion to be located outside the tube outer surface 28 of the outer member 22 and to cover the through-hole 27. The outward projection portion 32 is shaped so as to grip a portion around the through-hole 27 together with the lock projection 33 so that the vibration suppressing member 23 is locked on the outer member 22.

Since the outward projection portion 32 is seen from the outside, it goes without saying that it enables a visual check for a failure to attach the vibration suppressing member 23.

<Method for Manufacturing Wire Harness 15>

To manufacture the wire harness 15 shown in FIG. 1B, first, the harness body 19 shown in FIG. 2 is manufactured first by executing a first step and a second step in this order.

In the first step, an outer member 22 as shown in FIG. 3A is prepared. Then, as shown in FIG. 3B, work of inserting a conductive path 21 into the outer member 22 from its one opening to its other opening is performed. In this work, the conductive path 21 can be inserted smoothly because nothing exits inside (e.g., projects from) the tube inner surface 29 of the straight tube 26.

In the second step, work of attaching vibration suppressing members 23 to the outer member 22 from the side of its tube outer surface 28 is performed. In this work, first a worker inserts the inward projection portion 30 of each vibration suppressing member 23 into a through-hole 27 and then pushes the vibration suppressing member 23 with his or her finger so that the outward projection portion 32 goes through the through-hole 27. When all vibration suppressing members 23 have been attached to portions around the through-holes 27, the manufacture of a harness body 19 is completed.

Summary, Including Advantages, of the Embodiment

As described above with reference to FIGS. 1A and 1B to FIGS. 5A and 5B, the wire harness 15 according to the embodiment is equipped with the tubular outer member 22, the conductive path 21 which is inserted in the outer member 22, and the plural vibration suppressing members 23. According to the embodiment, since the vibration suppressing members 23 are attached to the outer member 22 after insertion of the conductive path 21, the efficiency of work of inserting the conductive path 21 into the outer member 22 is high.

Each vibration suppressing member 23 has the inward projection portion 30 which projects inward from the tube inner surface 29 when the vibration suppressing member 23 is attached to the outer member 22 from the side of its tube outer surface 28 after insertion of the conductive path 21. When the vibration suppressing members 23 have been attached to the outer member 22, the inward projection portions 30 of the vibration suppressing members 23 reduce the movable ranges of the conductive path 21 at the predetermined positions inside the outer member 22, whereby shakes of the conductive path 21 are suppressed. As a result, vibration of the conductive path 21 relative to the outer member 22 is suppressed by the vibration suppressing member 23.

As described above, the embodiment provides an advantage that shakes of the conductive path 21 inside the outer member 22 can be suppressed while high efficiency of work of inserting the conductive path 21 into the outer member 22 is attained.

<Modifications>

Next, modifications of the embodiment of the invention will be described with reference to FIGS. 6A and 6B to FIGS. 9A and 9B.

Figure 6A:
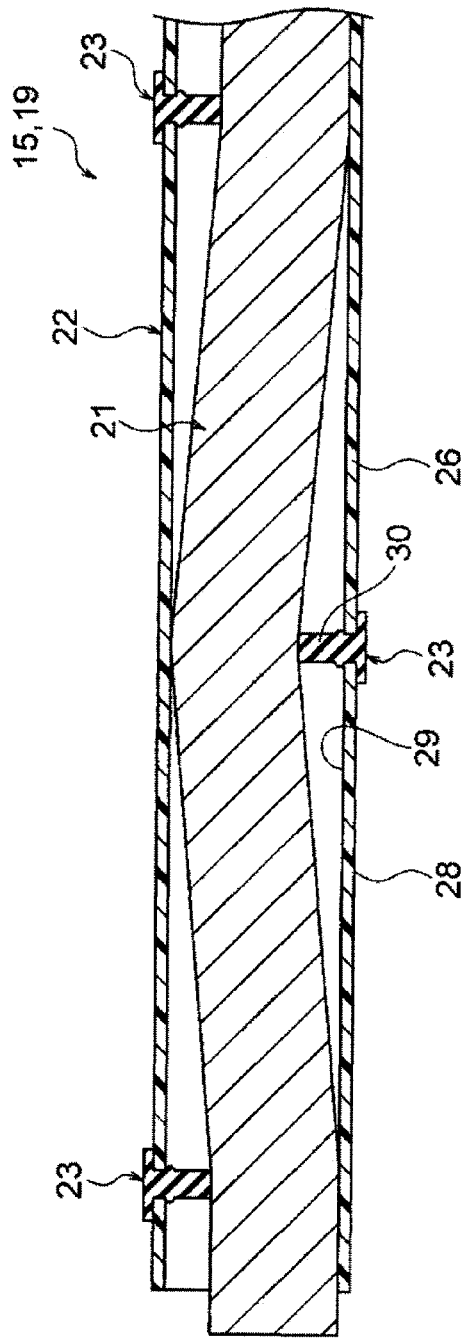
FIGS. 6A and 6B are sectional views showing modifications in which the attachment positions of the vibration suppressing members are different than in the embodiment, that is, a modification in which the vibration suppressing members are arranged in a staggered manner and a modification in which the vibration suppressing members are attached so as to push down the conductive path, respectively.
Figure 6B:
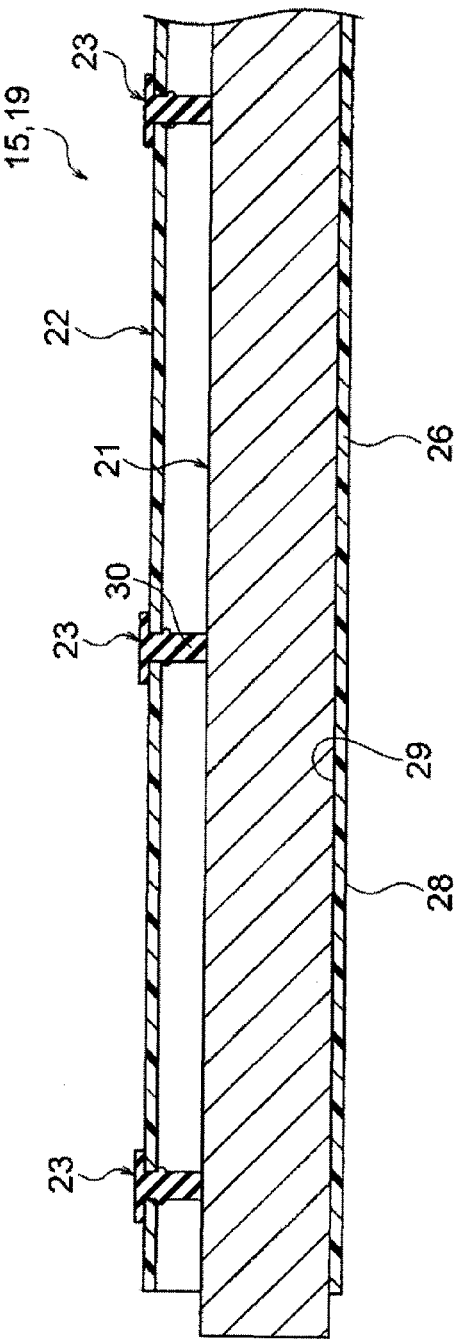
Figure 7A:
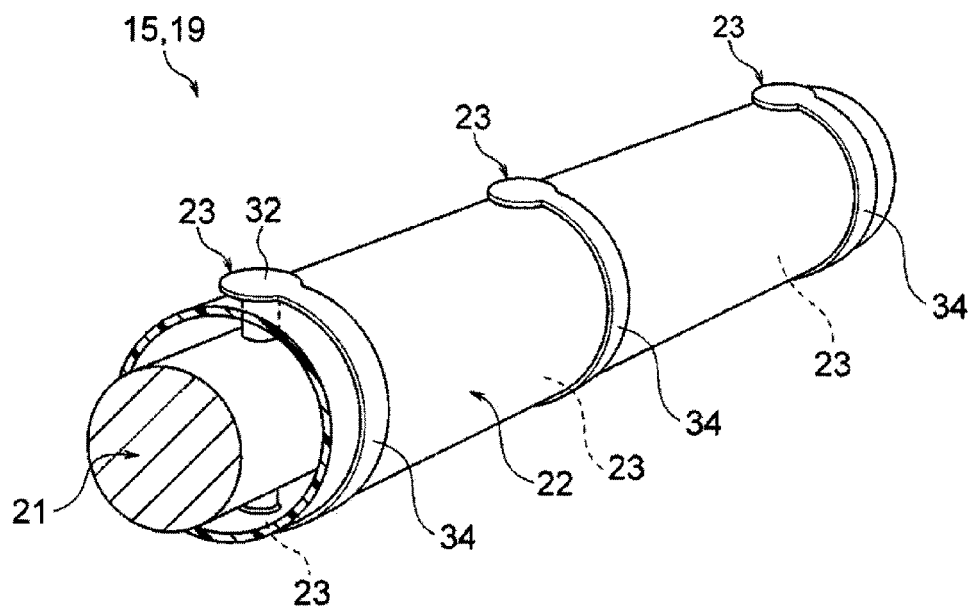
FIGS. 7A and 7B are perspective views showing modifications in which plural vibration suppressing members are connected to each other by a link portion(s), that is, a modification in which two vibration suppressing members are connected to each other in the top-bottom direction and a modification in which three vibration suppressing members are connected to each other in the tube axial direction, respectively.
Figure 7B:
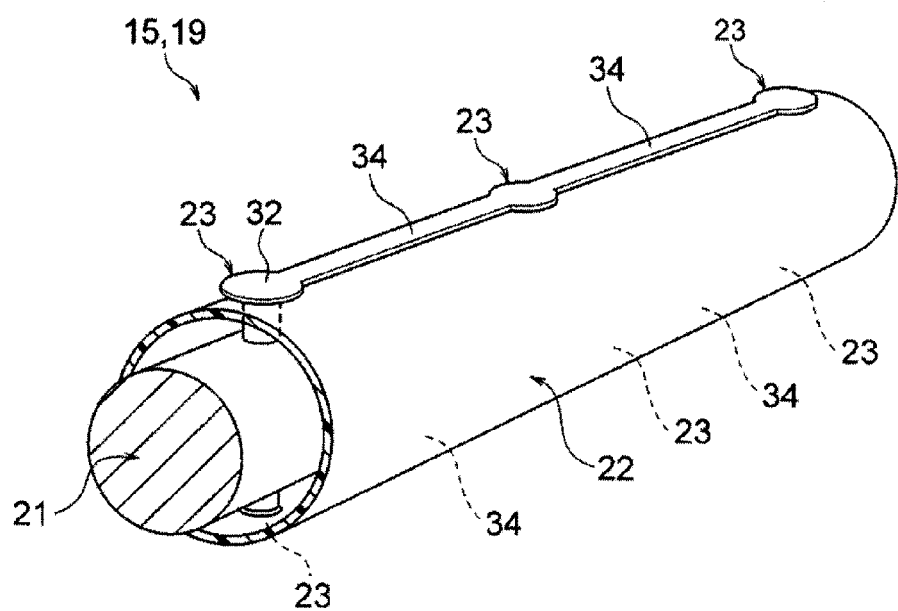
Figure 8:
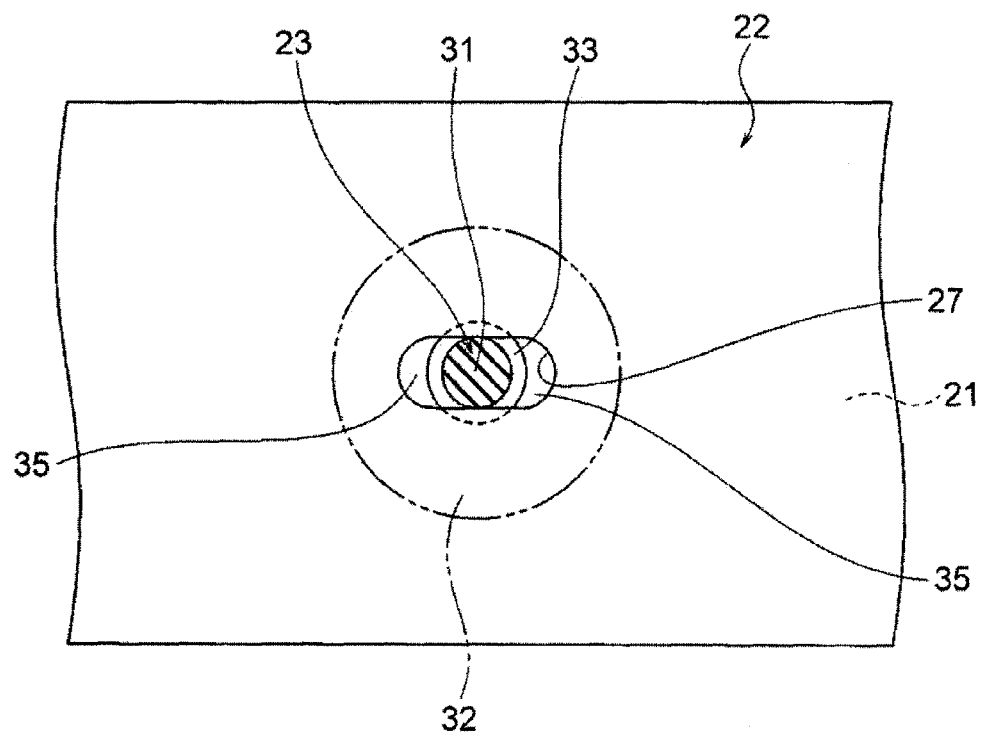
FIG. 8 illustrates a modification in which through-holes of the outer member are used as water drainage holes.

FIGS. 6A and 6B are sectional views showing modifications in which the attachment positions of the vibration suppressing members 23 are different than in the embodiment. FIGS. 7A and 7B are perspective views showing modifications in which plural vibration suppressing members 23 are integrated together by a link portion(s) 34. FIG. 8 illustrates a modification in which through-holes 27 of the outer member 22 are used as water drainage holes. FIGS. 9A and 9B are sectional views showing wire harnesses 15 according to other modifications.

<Changes of Attachment Positions of Vibration Suppressing Members 23>

As shown in FIG. 6A, the vibration suppressing members 23 may be attached to the outer member 22 so as to be arranged in a staggered manner. Furthermore, as shown in FIG. 6B, the vibration suppressing members 23 may be attached to the outer member 22 so as to be arranged straightly at its top and to thereby push down the conductive path 21 against a bottom portion of the tube inner surface 29 of the outer member 22. Still further, when necessary, vibration suppressing members 23 may be attached additionally at desired positions.

<Changes of the Shape of Vibration Suppressing Members 23>

As shown in FIG. 7A, top and bottom vibration suppressing members 23 may be connected to each other by connecting their outward projection portions 32 by a link portion 34. Furthermore, as shown in FIG. 7B, vibration suppressing members 23 may be connected to each other by connecting their outward projection portions 32 by link portions 34 in the direction that is parallel with the tube axis CL (see FIG. 2).

With each of the above sets of vibration suppressing members 23, since the plural vibration suppressing members 23 are connected to each other by the link portion(s) 34, it goes without saying that a worker can attach the vibration suppressing members 23 more easily than in a case of attaching them by holding them individually, and that the management of components is made simpler.

<Modification Relating to Through-Holes 27>

It goes without saying that the through-holes 27 of the outer member 22 can be used as water drainage holes if they are formed in, for example, an elliptical shape as shown in FIG. 8. That is, even if water has collected inside the outer member 22, it can be drained away through gaps 35 between the through-holes 27 and the outer member penetration portions 31.

<Changes of the Number of Conductive Paths 21>

It goes without saying that even in a case that two conductive paths 21 (see FIG. 9A) or three conductive paths 21 (see FIG. 9B) are inserted through the outer member 22, vibration of the conductive paths 21 relative to the outer member 22 can be suppressed.

It goes without saying that various other modifications are possible without departing from the spirit and scope of the invention.

As is understood from the above description, vibration of the conductive path(s) 21 relative to the outer member 22 can be suppressed by the vibration suppressing member 23. Even if a portion of the outer circumferential surface 24 of the conductive path 21 or one of the conductive paths 21 touches the tube inner surface 29 of the outer member 22, resulting impact is much weaker than in conventional cases and hence the conductive path 21 is not damaged (in the case of a conductive path 21 having a shield function, damage of a braid or a metal foil does not cause any problems).

What is claimed is:

1. A wire harness comprising:
   a tubular outer member;
   a conductive path which is inserted in and protected by the outer member; and
   a vibration suppressing member which reduces a movable range of the conductive path to suppress shakes of the conductive path,
   wherein the vibration suppressing member comprises an inward projection portion which projects inward from a tube inner surface of the outer member in a state in which the vibration suppressing member is attached to the outer member from a side of a tube outer surface after insertion of the conductive path.

2. The wire harness according to claim 1,
   wherein a position where the vibration suppressing member is attached to the outer member includes a position of at least a portion of the outer member to be routed straightly.

3. The wire harness according to claim 2,
   wherein the portion of the outer member to be routed straightly has a circular shape in cross section.

4. The wire harness according to claim 2,
   wherein the portion of the outer member to be routed straightly is to be routed under a floor of an automobile.

5. The wire harness according to claim 1,
   wherein the wire harness comprises a plurality of vibration suppressing members which are attached to the outer member so as to be arranged in a tube axial direction of the outer member straightly at a predetermined interval, in a staggered manner, or at a constant pitch around a tube axis of the outer member.

6. The wire harness according to claim 5, wherein the predetermined interval is equal to about 200 mm.

7. The wire harness according to claim 1,
   wherein the vibration suppressing member is made of an elastically deformable material.

8. The wire harness according to claim 1,
   wherein the vibration suppressing member further comprises:
   an outer member penetration portion which penetrates through a through-hole formed in the outer member; and
   an outward projection portion which projects from the tube outer surface of the outer member and covers the through-hole.

9. The wire harness according to claim 8,
   wherein the through-hole is formed so as to serve as a water drainage hole.

10. The wire harness according to claim 8, further comprising:
    a link portion which is integrated with the outward projection portions of the vibration suppressing members to connect the vibration suppressing members to each other.

11. A method for manufacturing a wire harness, comprising:
    inserting a conductive path into a tubular outer member; and attaching a vibration suppressing member comprising an inward projection portion to the outer member from a side of a tube outer surface after insertion of the conductive path to cause the inward projection portion to project inward from a tube inner surface of the outer member.

* * * * *